(12) United States Patent
van de Kamer

(10) Patent No.: US 10,921,678 B2
(45) Date of Patent: Feb. 16, 2021

(54) ELECTROPHORETIC DEVICE

(71) Applicant: Elstar Dynamics Patents B.V., Rockanje (NL)

(72) Inventor: Johannes Petrus van de Kamer, Ruurlo (NL)

(73) Assignee: Elstar Dynamics Patents B.V., Rockanje (NL)

( * ) Notice: Subject to any disclaimer, the term of this patent is extended or adjusted under 35 U.S.C. 154(b) by 121 days.

(21) Appl. No.: 16/302,579

(22) PCT Filed: May 15, 2017

(86) PCT No.: PCT/NL2017/050302
§ 371 (c)(1),
(2) Date: Nov. 16, 2018

(87) PCT Pub. No.: WO2017/200375
PCT Pub. Date: Nov. 23, 2017

(65) Prior Publication Data
US 2019/0302564 A1     Oct. 3, 2019

(30) Foreign Application Priority Data

May 17, 2016   (NL) ..................................... 2016789

(51) Int. Cl.
*G02F 1/167*     (2019.01)
*G02F 1/16755*   (2019.01)
(Continued)

(52) U.S. Cl.
CPC ............ *G02F 1/167* (2013.01); *G02F 1/1676* (2019.01); *G02F 1/1677* (2019.01);
(Continued)

(58) Field of Classification Search
CPC .... G02F 1/167; G02F 1/16755; G02F 1/1685; G02F 1/16766; G02F 1/1677; G02F 2201/122; G02F 1/1676
See application file for complete search history.

(56) References Cited

U.S. PATENT DOCUMENTS 8,179,590 B1    5/2012  Mabeck et al.
9,013,780 B2 *  4/2015  Henzen .................. G02F 1/167
                                               359/296
(Continued)

FOREIGN PATENT DOCUMENTS

CN      101575463       11/2009
JP      2005-157041     6/2005
(Continued)

OTHER PUBLICATIONS

Fitzhenry-Ritz, Beverly, "Optical Properties of Electrophoretic Image Displays", IEEE Transactions on Electron Devices, vol. ED-28, No. 6, 1981, 726-735.

*Primary Examiner* — Robert E. Tallman
(74) *Attorney, Agent, or Firm* — Peacock Law P.C.; Janeen Vilven; Justin Muehlmeyer

(57) ABSTRACT

The present invention is in the field of an electrophoretic device for switching between a transparent and non-transparent mode, the device having pixels, the pixels comprising a fluid and colored particles, and comprising various further elements, as well as uses thereof, in particular as a window blind and for signage.

14 Claims, 3 Drawing Sheets

(51) Int. Cl.
    *G02F 1/1685*    (2019.01)
    *G02F 1/16766*   (2019.01)
    *G02F 1/1677*    (2019.01)
    *G02F 1/1676*    (2019.01)

(52) U.S. Cl.
    CPC ........ *G02F 1/1685* (2019.01); *G02F 1/16755* (2019.01); *G02F 1/16766* (2019.01); *G02F 2201/122* (2013.01)

(56) References Cited

U.S. PATENT DOCUMENTS

| | | | |
|---|---|---|---|
| 2010/0328758 A1 | 12/2010 | Sikharulidze et al. | |
| 2012/0188152 A1* | 7/2012 | Henzen | G02F 1/167 345/107 |
| 2013/0170014 A1 | 7/2013 | Kong et al. | |
| 2014/0022624 A1 | 1/2014 | Yang et al. | |
| 2015/0277101 A1* | 10/2015 | Novoselov | H01L 21/28 359/290 |

FOREIGN PATENT DOCUMENTS

| | | |
|---|---|---|
| NL | 2010936 | 9/2014 |
| WO | 2003/009059 | 1/2003 |
| WO | 2004/008238 | 1/2004 |
| WO | 2007/004120 | 1/2007 |
| WO | 2008/010163 | 1/2008 |
| WO | 2014/196853 | 12/2014 |
| WO | 2017/200375 | 11/2017 |

\* cited by examiner

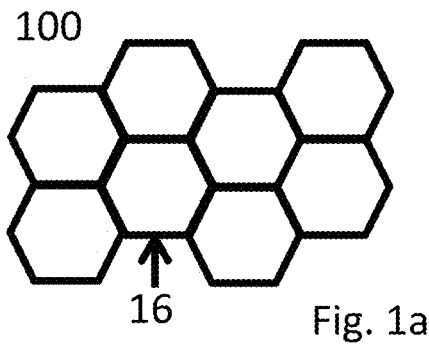
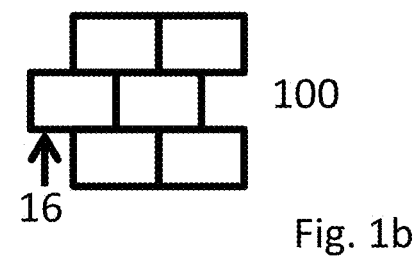
Fig. 1a  Fig. 1b
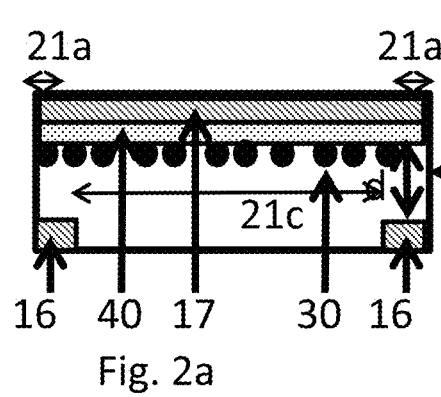
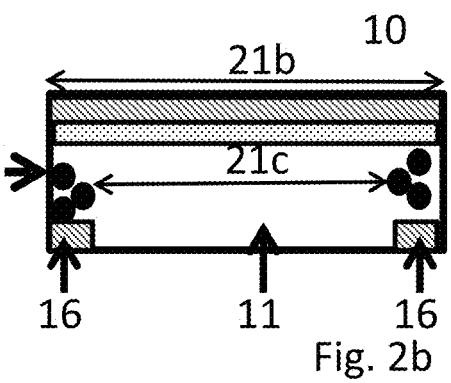
Fig. 2a  Fig. 2b
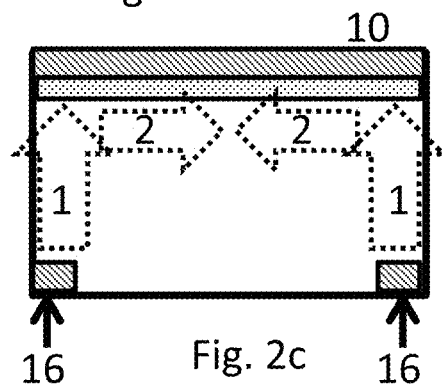
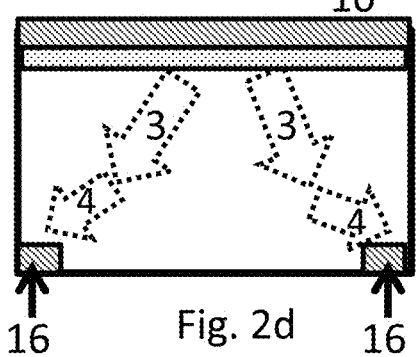
Fig. 2c  Fig. 2d
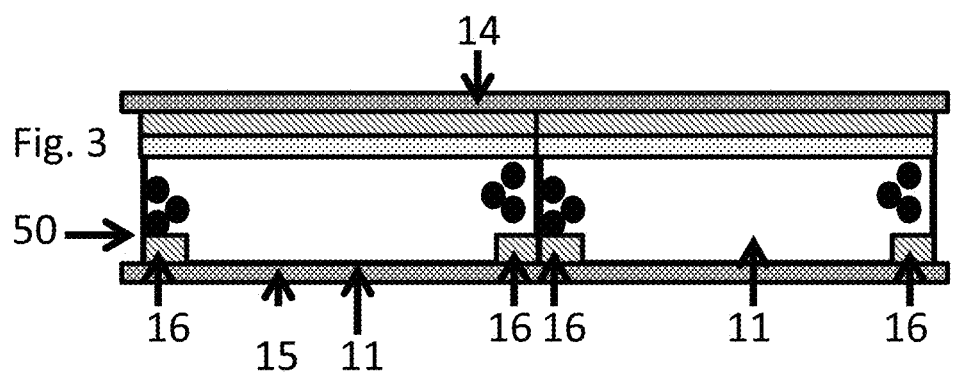
Fig. 3

ELECTROPHORETIC DEVICE

FIELD OF THE INVENTION

The present invention is in the field of an electrophoretic device for switching between a transparent and non-transparent mode, the device having pixels, the pixels comprising a fluid and colored particles, and comprising various further elements, as well as uses thereof, in particular as a window blind and for signage.

BACKGROUND OF THE INVENTION

Electronic display devices and especially electrophoretic display devices are a relatively new technique of pixilated display devices in which charged pigment particles are moved vertically to generate a required pigmentation of a pixel. In a first approach thereof black and white particles are encapsulated, defining a closed space wherein black particles move upwards at the same time when white particles move downwards, or vice versa; so either the white or the black particles are visible and hiding the other type at the same time; a transparent state is not possible. Pigment particles can not freely move, as they are enclosed in microcapsules. The pigment particles are relatively large, typically larger than 500 nm (0.5 µm), and on average 1 µm or larger. The two electrodes typically used are located above one and another. The switching is achieved by an electric field, the particles typically being charged or chargeable; this technique is often referred to as E-ink, such as of US2002/167500 A1. The microcapsules, typically made of plastic, are relatively small (30 µm or less); however much smaller sizes are up to now not possible to manufacture, especially in view of the microcapsules and plastic used therein. It is noted that despite claims colored particles are simply not available for the E-ink technology. Only by applying a color filter a color may be provided. At best such relates to a very limited brightness and number of colors, and certainly not to vibrant full color displays. The switching is relatively fast (within 300 msec), the stability is good (above 10 sec), and the contrast is good as well. E-ink has as (further) disadvantage that is relatively difficult to produce, production is expensive, and production yield is too low (too much fracture, too much waste). In addition stacks of layers can not be formed due to the inherent presence of microcapsules being either in a white or black status, i.e. always providing a "colour".

In an alternative technique the colored particles can move more freely throughout a pixel, largely independently of one and another. The colored particles move from one location in the pixel to another location, also typically due to an applied electrical field. A first location is typically where particles accumulate, and have a high density or concentration, whereas a second location is where particles are spread out, typically evenly, and have a lower concentration or density. The area of the first location, often referred to as accumulation area, is relatively small. The accumulated particles are badly visible for the human eye or not at all, that is the eye perceives the accumulated particles as being absent or at the most a greyish impression or the like is perceived. In addition the accumulation area may be hidden, such as behind a cover. The second location, often referred to as field electrode, has a larger area, compared to the accumulation area, typically a few times larger. The particles on the field electrode are visible to the eye, giving an impression of a (largely) colored pixel. Switching is achieved by moving particles from the accumulation electrode to the field electrode. By compacting the particles towards the accumulation area the transparency of the display is changed. The movement is at least partially laterally, as the accumulation area and field area do not cover one and another in a vertical direction. In a top view the field area and accumulation area are located adjacent to one and another, contrary to the E-ink approach.

For further details of present developments in this field as well as for drawbacks of the present technology reference is made to recently filed NL2010936, which reference is incorporated herein by explicit reference. A main difference compared to other technologies is that the colored particles are always visible. Some details are provided below.

A benefit of the lateral switching of charged particles is that the electrophoretic display device may comprise a fully transparent state. In principle a choice of reflector or possibly backlight is possible.

However, in an electrophoretic display it is relatively difficult to control the electrical field and particle motion distribution accurately enough to provide a homogenous pixel absorbance in the "dark" state as well as to fix the particles in the "light" state to an electrode.

Also switching from a first state to a second state in the above display may be relatively slow; typically too slow for many applications, even with recently improved devices. It is noted that typically prior art particles move at a speed of less than about 0.1 mm per second, which is considered at least ten times too slow for certain applications.

Even further stability of the dark or transparent state is a challenge. Also contrast is not optimal, due to the presence of the accumulation area.

Recently it has been found that also the precise control and movement of particles is much more complex that apparently hypothetically possible. For instance, a small local variation in the thickness of the substrate may cause a large local variation in electrical field; likewise an unintentional off-set or poor definition in a horizontal plane of an (field or storage) electrode with respect to another (storage or field) electrode may cause a (further) variation in electrical field; in this respect note that a height of the pixel is typically some 25-50 µm, whereas perturbations of the substrate may be in the order of 1-5 µm, that is 4-20% relative. This is found to result in rather uncontrolled switching times and a poor distribution of colored particles, and is not predictable enough.

For full color displays, which may comprise a stack of the above pixels, the situation is clearly even worse.

It is noted that some major companies developing displays have stopped to develop electrophoretic displays, being discouraged by negative results, complexity of the technology, and lack of prospect. For similar reason providers of pigmented particles had stopped further development as well.

As a consequence use and practical applications of the above electronic displays are so far limited, typically to relatively expensive devices, despite potential advantages. Prior art devices, such as LCD or LED type, have various limitations. For instance, such a screen has a limited viewing angle; as a consequence typically only one person, at the most a few, can view the screen at the same time. For a relatively small screen the number of viewers is even smaller. The screen is further not optimized in terms of energy consumption; typically the entire screen operates in full color, or in black and white, thereby consuming more energy than strictly necessary. Further typically applications work under similar or the same boundary conditions, e.g. in full color. Resolution of screens is also limited, e.g. to 10-30 dots per inch (DPI), which is for many applications considered too low. It is noted that high end mobile phones may have a somewhat higher resolution, e.g. up to 400 DPI. In view of resolutions of e.g. photos and optical cameras such is relatively low.

Inventors have identified various documents reciting potential layouts of pixels, but these layouts typically do not solve the above problems and may even introduce further problems.

For instance, US2014/022624 (A1) recites a display device comprising a display fluid layer sandwiched between a first substrate layer and a second substrate layer, and a light-enhancing layer between the display fluid layer and the second substrate layer. The light-enhancing structure can enhance the colors displayed by the display device, especially the colors displayed through lateral switching of the charged pigment particles in an electrophoretic fluid. The charged particles are distributed throughout a fluid. Control of movement, stability and switching times still seem problematic.

WO2008/010163 (A2) recites an array device comprising an array of rows and columns of device cells, each device cell comprising a sealed region containing a fluid in which particles are suspended, wherein the movement of particles within each cell is controlled to define a cell state, the cell states of all device cells together defining an output of the device. The device comprises an array of orthogonal addressing conductors. The overflow channel enables the sealing of the cells can be conducted with excess cell fluid having a passageway to drain to. The electrode design also enables short and/or open circuits to be tolerated. This document relates more to switching a device and in some ways to design of pixels; it does not address the above problems.

WO2007/004120 (A2) recites a method for driving an in-plane switching multi-color electrophoretic display. The display comprises a plurality of pixels and a common electrode for electrically separating the pixels from each other, each of the pixels comprises a pixel electrode for attracting or repelling pigment particles.

WO2004/008238 A2 recites an in-plane switching electrophoretic display device (IPS-EPD), comprising a layer of electrophoretic material, being sandwiched between a first and a second substrate, a pixel of said display further comprising a first and a second electrode for locally controlling the material of said electrophoretic layer. The first and second electrodes are positioned on essentially the same distance from said first substrate, so that an essentially lateral field is generated in said electrophoretic layer when a signal is applied over said electrodes, in order to enable transflective operation.

The above two displays can be regarded as typical for presenting all the disadvantages of the prior art, as indicated above.

WO2003/009059 A1 recites an improved EPD which comprises the in plane switching mode. More specifically, the EPD of the invention comprises isolated cells formed from microcups of well-defined size, shape and aspect ratio and the movement of the particles in the cells is controlled by the in-plane switching mode. The EPD of the invention may be produced in a continuous manufacturing process, and the display gives improved color saturation. This document relates to an in old-fashioned mode arranged RGB pixels, provides largely irrelevant details, is limited to microcups which are most likely not suited for production purposes and reflects more the issues that needed to be solved rather than solutions thereto.

U.S. Pat. No. 8,179,590 (B1) recites an electro-optical display includes colorant particles that are suspended in a carrier fluid. The colorant particles are controlled by three different types of electrodes, which is considered complex. An ex-posed electrode acts on the colorant particles in an electro-kinetic manner by compacting the colorant particles. A passivated electrode acts on the colorant particles in an electro-static manner by holding the colorant particles once compacted. A reference electrode attracts the colorant particles to compaction areas. The document is not very specific on details; figures at the best represent schematics and do not provide details by themselves; in addition reducing the travel distance is discouraged. The particles used relate to dyes that comprise molecules that can be charged; these dyes are not suited for the present application.

WO 2014/196853 A is focused on reducing a size of a pixel, which is not very relevant for the present invention.

US 2013/0170014 A1 recites a method of preparing core shell pigment particles. Particles formed are relatively large, from 170-800 nm, which sizes are not preferred.

Fitzhenry in "Optical properties of Electrophoretic Image Displays", IEEE Transactions on Electron Devices, Vol. 28, No. 6, June 1981, p. 726-735, recites theoretical brightness using $BaSO_4$ suspensions, which are not suited for the present invention; in addition the organic pigment mentioned is totally different from the ones used below.

In general it is noted that the electrophoretic pixel are relatively difficult in terms of to be modelled. Simple calculations, such as linking fluid viscosity and applied field, do not apply well in practice. Such is reflected by the fact that major companies have been trying to develop electrophoretic pixel unsuccessfully over the years.

It is an objective of the present invention to overcome disadvantages of the prior art electronic devices without jeopardizing functionality and advantages.

SUMMARY OF THE INVENTION

The present invention relates in a first aspect to an electrophoretic pixel according to claim 1, in a second aspect to a device comprising said pixel, in a third aspect to a use of said device, and in a fourth aspect a product comprising said device.

The present device comprises electrophoretic pixels, typically with a density of a few hundred DPI. Typically two substrates (14,15), which may be referred to as a bottom (second) substrate and a top (first) substrate, enclose pixels at two sides thereof. The pixels comprise a fluid, typically a transparent fluid. The fluid allows movement of coloured particles through the fluid. The particles are always visible they are either compacted on the accumulation electrode 16 (transparent state) or they are spread over the common electrode 40 in the dark state. In the present pixel stored particles are still visible, such as under a microscope. In terms of brightness in a transparent state of the pixel (particles stored) is therefore not maximal, but typically 80-95% of a theoretical maximum.

The pixels comprise coloured particles, being capable of moving form a first location (e.g. storage or also referred to as accumulation area) to a second location (e.g. common area). Thereto the particles are charged or chargeable. Also the particles are found to be relatively small, e.g. smaller than 900 nm, preferably smaller than 400 nm, and larger than 30 nm, preferably larger than 40 nm, such as 60-200 nm. For improved movement and control smaller particles are preferred.

For imparting movement two electrodes are provided, a so called field electrode 17 and an accumulation (or storage) electrode 16, similar to the common area and accumulation area 21*a*. For the present invention two electrodes are found sufficient. The accumulation electrodes occupy an area, whereas the field electrode is not patterned and in principle substantially fully covers the first substrate, at an inner side thereof, i.e. towards the fluid. The accumulation electrode occupies an accumulation electrode area, wherein the at least one storage area above electrodes 16 is adjacent to the at least one central area 21*c*, and wherein the storage area and the accumulation electrode area largely coincide. In view of the requirements to the present pixel the common area 21*b* is larger than the accumulation electrode area. One electrode may relate to an electrically neutral (or ground) electrode. It is noted that the terms "accumulation" and "field" relate to a function intended by the respective electrodes.

For controlling movement of colored particles and stability of a status (transparent or colored) in a device a driver circuit for applying an electro-magnetic field to the pixels is provided.

The present pixel is characterized in that the field electrode is not patterned. This provides movement of the particles. The present pixel typically has a distance between the first and second substrate smaller than 20 µm. The substrates enclose a pixel at least partly. The distance is much smaller than typical prior art devices. The present design, allowing lateral movement, as well as a relatively small distance provide a much better control of the movement of the particles, a good control of the electrical field being almost insensitive to imperfections of the materials used, such as perturbations, no production issues when outlining the substrates, and providing a good stability of the two statuses. Even further, the present design allows for stacking of pixels, contrary to prior art devices, such as is further detailed below.

For moving the particles around an appropriate electrical field is applied to the storage electrode, e.g. attracting or repelling the charged particles. Such is done for each and every pixel where an effect is envisaged; other pixels may have no electrical field. In this way each individual pixel can be addressed independently and as a consequence each individual pixel can be in a transparent (only nanoparticles visible on the accumulation electrode 16) or in a "colored" mode. Likewise the field electrode can as a whole be at a zero (0) voltage, or at a positive or negative voltage, thereby contributing to the electrical field. In a similar fashion the electrical field can be refreshed now and then.

The present pixel may comprise walls 50. The walls may fully enclose one pixel, or may have one or more gaps. Also each wall section may have one or more gaps. For instance, horizontal or vertical gaps may be provided. The gaps may have a size of 10-200 µm length, such as 20-100 µm, e.g. 50 µm. Such is found to improve capillary flow and filling.

An advantage of a prior art pixel and likewise display for in-plane switching of particles is that only one substrate is needed on which both of the electrodes are patterned. In producing such a pixel during patterning small (etch-)errors result in defective pixels/displays; a yield of such a process can be relatively low. With the present layout these production errors are circumvented. In addition, as is e.g. shown in FIG. 1 *a,b*, an electrical layout may be over dimensioned in that more than one connection for the second electrode in question can be provided, therewith preventing missing contacts to result in defective pixels. In present production samples errors are rarely observed, typically in a range of <5 ppm, such as <1 ppm; the design is considered to be robust in this respect.

The term "optical" may relate to wavelengths visible to a human eye (about 380 nm-about 750 nm), where applicable, and may relate to a broader range of wavelengths, including infrared (about 750 nm-1 mm) and ultraviolet (about 10 nm-380 nm), and sub-selections thereof, where applicable.

Important is that the present pixel and device are fully adaptable, e.g. to changing light conditions.

The present electronic display device comprises pixels therein, which pixels can be changed instantly, i.e. within a few hundred milliseconds, e.g. replacing an image by another.

It is noted that producing nanoparticles suitable for the present application is far from trivial. Major companies have been trying to produce suitable particles in terms of size, stability, charging, and compatibility with a fluid used, in vain. The present nanoparticles comprise a pigment, and a coating, and may comprise a core, wherein the nanoparticles are adapted to be provided with a charge, wherein a size of the nanoparticles (with or without core c.q. coating) is from 20-100 nm, preferably from 30-80 nm, such as 40-50 nm; in an alternative other types of particles may be used, such as particles only comprising a pigment like entity/molecule, ink type particles, etc.; the particles would in any case be capable of providing a color or be black or white. In sight the colored particles provided the colored appearance to the present pixel. Such is contrary to prior art used particles, such as those of $TiO_2$ (white) or graphite (black), which are grinded to small particles (typically <10 nm, such as <2 nm) and which may carry a charge by themselves; it has been found that these grinded particles need to be extremely small as otherwise coagulation and clogging would occur. In the present invention it is typically the coating that is provided with a charge. The core and the pigment may be one and the same. The present particles respond in a very precise manner to physical laws, which make them controllable. For instance an amount of particles being visible can be fine-tuned by e.g. increasing/decreasing a length of a change in electrical field, the size of said electrical field, re-establishing the electrical field, and so on.

In a pixel typically only one type of colored particles is present, such as selected from red, green, and blue, or from magenta, cyan, and yellow. A pixel changes from white (transparent) to one of the colors, and vice versa, upon change of an electric field. In addition black particles may be present, but not necessarily, which would complicate the design somewhat. For black/white applications, e.g. an e-reader, only black particles are typically present.

For full color applications a stack of two or three pixels could provide most or all colors, respectively. Such a stack is considered impossible with E-ink type layouts, as in such a case either black or white particles would always be visible; also there is no option to provide further typically considered features as haze, contrast, warm/cold effect, complementary contrast, simultaneous contrast, saturation, intensity, etc. For the present pixel all these features can be adapted and controlled very precisely.

The present non-optimal pixel comprising only black particles is found to have a twice as high black contrast, 50% more white (60% versus 43%), compared to e.g. E-ink devices. Also the distribution of particles is more homogeneous (as can be observed under a microscope), it requires a simple controller, and has two stable statuses.

The present device comprises a driver circuit for changing appearance of (individual) pixels by applying an electromagnetic field. As such also appearance of the display device, or one or more parts thereof, may be changed.

The present device may further comprise a means for receiving data, such as individual pixel data, pixel color data, pixel filter data, pixel spectral data, pixel reflectivity data, pixel transmittance data, pixel intensity data, and display pattern data, etc. As such the present device can be controlled on a pixel level, on a display level, on a matrix of pixels level, and combinations thereof. It is preferred to provide data in a wireless mode; however data may also be provided by connecting a cable or the like, such as be providing a USB-port or the like. For the wireless mode preferably an RFID per display device is provided, as well as a transmitter for communicating with the display, preferably a transceiver, for also receiving data from a display. As such each individual display device and display can be adapted, e.g. according to wishes of a user, and to light conditions.

The present electronic device may comprise a unique code for identification. As such every electronic device can be identified individually.

The present display device, including substrates, protective layer, etc. is relatively thin and can therefore in principle be applied to e.g. a stack of devices. The display present has a thickness <0.1 cm, preferably a thickness of 10 µm-500 µm, more preferably a thickness of 15 µm-300 µm, even more preferably a thickness of 25 µm-200 µm, such as 50 µm-100 µm. A thickness may vary, e.g. depending on a number of devices applied. As such the present display device (in a transparent mode) is not or hardly visible for a human eye.

The present device may comprise a processing unit, typically a CPU, for processing input, providing output, processing data, etc.

Especially for smaller devices also a power supply may be provided, typically a battery.

The present invention relies partly on earlier research and development by IRX Technologies B.V. For that reason and for better understanding of the underlying technology reference is made to recently filed (Jun. 7, 2013) Dutch Patent application NL2010936. Various aspects, examples, advantages and so forth are in principle one to one applicable to the present invention. It is noted that the technology disclosed in the above patent applications has not been put into practice yet. Various obstacles have been en-countered that still had to be solved. For instance bi-stability and switching times were not sufficient. Various other aspects, examples, advantages and so forth are in principle one to one applicable to the present invention. The teachings and examples of the above document are incorporated by reference herein. The present invention provides amongst others an improved layout in view of the prior art.

Thereby the present invention provides a solution to one or more of the above mentioned problems.

Advantages of the present description are detailed throughout the description.

DETAILED DESCRIPTION OF THE INVENTION

The present invention relates in a first aspect to an electrophoretic pixel device according to claim 1.

The pixel comprises a fluid (or liquid). The fluid may be any suitable fluid and a combination of suitable flu-ids. It is preferred to use a relatively low viscosity fluid, such as having a dynamic viscosity of 1 mPa·s or less. The fluid comprises at least one type of pigment particles having a diameter smaller than 100 nm; typically it comprises only one type of particles. The diameter of the particles is defined herein to be the largest distance that can be formed between two opposite parallel lines tangent to its boundary. It has been found that these particles provide a good distribution of particles over the present (field) electrode. In view of an electro-magnetic field to be applied the present particles are being chargeable or charged. Likewise magnetic particles may be used. A small charge per particle is found to be sufficient, such as from 0.1e to 10e per particle. A concentration of particles is in the order of 1-100 g/l. A size of an electric potential is in the order of 0.5-50 V, preferably from 1-20 V, such as 5-15 V. For the present pixel a relatively large potential is preferred, e.g. 5-30 V. It is noted that in view of the small distance between first and second electrode the electrical field (V/µm) is much higher compared to prior art devices, typically 5-20 times higher. It has been found that fluid behaviour is better at a higher voltage, e.g. in terms of flow, and switching time. It is preferred to have particles charge stabilized. As such a better performance e.g. in view of distribution over the field electrode, and faster and better controllable switching times are achieved.

In an example a thin-film transistor is applied to drive a pixel, optionally in combination with other drivers.

In an example the first electrode is a spray-coated electrode. Such an electrode can be applied easily, has a good performance and reduces production costs. An example of such an electrode is an ITO electrode. The ITO typically has a 50-250 Ohm/square resistance, such as 100-150 Ohm/square. A thickness of the first electrode is typically 1-20 µm, preferably 2-10 µm, such as 3-5 µm. The second electrode has typically a similar thickness.

In an example the present device comprises a stack of 2-5 pixels, such as a stack of 3 pixels, each pixel in the stack comprising different coloured particles. Therewith a full colour device is provided. In an example thereof a first substrate of a second pixel and a second substrate of a first pixel are the same, i.e. are combined into one substrate. Such is a big advantage of the present device, therewith reducing the number of substrates in a stack, improving contrast and transparency, and reducing complexity. In an example the fluid is transparent. The above examples may be combined in full or in part.

In an example of the present stack of pixels the coloured particles are selected from cyan, magenta, and yellow particles, and from black and white particles. In an example the first pixel in the stack comprises cyan particles, the second comprises magenta particles, and the third comprises yellow particles. By individually switching pixels in the stack, i.e. cyan, magenta and yellow, full colour control is achieved.

In an example if the present pixel a density of pixels is from 2-500 pixels/cm, preferably 5-250 pixels/cm, more preferably 10-100 pixels/cm, even more preferably 25-75 pixels/cm, such as 40-60 pixels/cm (or 120 and 160 DPI, respectively). Surprisingly these dimensions provide the best results in terms of contrast, sharpness, haze factor, and brightness. In fact the present device is better than e.g. a 160 DPI LCD.

In an example of the present pixel the first and second substrate are spaced apart by (glass) beads having a diameter of 2-10 µm, preferably 4-6 µm, such as 5 µm. The randomly distributed beads, preferably glass beads or polymer beads, define a distance between the substrates very accurately, provide strength and flexibility to the pixel, and hardly disturb movement of the coloured particles. The beads can be produced such that a very homogenous distribution of sizes thereof is obtained, e.g. with an accuracy (and thus 3*standard deviation) of better than 0.1 µm. The average volume of beads is 0.1-15 vol. % relative to the volume of the pixel, i.e. they occupy only small volume.

In an example of the present pixel a pixel area is from 2000 µm²-25 mm², preferably 5000 µm²-10 mm², more preferably 10000 µm²-5 mm², such as 1-2 mm². So a relatively large variation in size is possible, which may be relevant to an intended application of the present pixels/displays.

In an example of the present pixel the central area is from 60-95% of the pixel area, preferably form 70-90%, such as 75-80%. The central area, is preferably as large as possible, in view of e.g. contrast.

In an example of the present pixel the accumulation electrode area is from 2.5-20% of the pixel area, preferably 5-15%, such as 10-12%. The accumulation area is preferably as small as possible.

In an example of the present pixel the accumulation (or second) electrode comprises two or more electrical connection junctions, such as in a honeycomb structure; as such movement of the articles is better controlled, scarcely occurring production defects in the connections typically do not limit operation of the present pixel, and switching times are reduced. It is noted that typically a relative amount of pixel fails in production is in the order of 100-1000 ppm; only high end devices have a lower amount of pixel fails, e.g. 10-100 ppm. The present pixel has a relatively low amount of fails of 10-50 ppm.

In an example of the present pixel the pixels have a rectangular form, such as square, or a hexagonal form.

In an example the present device comprises a reflector for reflecting light that has passed through at least the first transparent substrate and the liquid, such as an internal or an external reflector, wherein the reflector is white, or metallic; and an active matrix arranged on the second substrate on a side facing the liquid, wherein the active matrix comprises for each pixel typically in an electrophoretic display: at least two metal layers, such as Al; a dielectric layer, such as $SiO_2$; a storage capacitor formed using the at least two metal layers and the dielectric layer, and wherein the reflector is preferably formed by at least one of the at least two metal layers.

In general the reflectance of the present pixel is much higher than that of prior art pixels. Typically more than 50% is reflected, especially when using a reflector as identified above, such as a reflector reflecting >98% of incident light. As a result for black particles a transmittance of >65% is achieved, and for sophisticated pixels values of 71% or more are achieved. For coloured particles (such as CMY) a transmittance of >80% is easily achievable, whereas levels of >85% or even >90% have been reached. Especially in view of stacked pixels such is very relevant.

In an example the present pixel comprises a scattering element configured to diffusively scatter light reflected by the reflector. Therewith contrast is improved.

In addition exemplary embodiments as outlined through the specification may be combined, such as the ones given below.

In an example of the present device the fluid comprises one or more of a surfactant, an emulsifier, a polar compound, and a compound capable of forming a hydrogen bond.

In an example of the present device the fluid has a relative permittivity $\varepsilon_r$ of less than 10, and a viscosity of less than 0.1 Pa*s, such as from 0.2-10 mPa*s, e.g. 0.5-5 mPa*s, e.g. 1-2 mPa*s.

In an example of the present device the fluid is present in an amount of 1-100 gr/m², preferably 2-75 gr/m², more preferably 20-50 gr/m², such as 30-40 gr/m². It is a big advantage that with the present layout much less fluid, and likewise particles, can be used.

In an example of the present device the coloured particles are present in an amount of 0.02-30 gr/m², preferably 0.05-10 gr/m², more preferably 0.5-5 gr/m², such as 1-3 gr/m².

In an example of the present device the at least one type of coloured particles comprise one or more of white particles, red particles, green particles, blue particles, black particles, reflective particles, light absorbing particles, fluorescent particles, and phosphorescing particles, and/or each type of pigment particle carries a significantly different charge, such as one being charged positively, another negatively, a third with a small charge, and a fourth with a large charge, etc. In an example the charge is from $5*10^{-7}$-0.1 C/m², such as from $1*10^{-5}$-0.01 C/m². In an example the present pigment may change colour or appearance upon applying an electro-magnetic field, or likewise upon removing such a field.

In an example of the present device the coloured particles are smaller than 400 nm, preferably smaller than 300 nm, more preferably smaller than 200 nm, even more preferably smaller than 100 nm, such as smaller than 50 nm, and typically larger than 10 nm. It is preferred to provide a stable dispersion; as such the above sizes are preferred. The particle size is considered to be a measure of an averaged diameter thereof. Light scattering can be used to determine a particle size distribution, such as using a Malvern Zetasizer Nano Range. It has further been found that smaller particles attribute significantly to the present characteristics of the pixels.

In an example of the present pixel the at least one field electrode is at least partly transparent to visible light, typically >95% transparent, or wherein at least one field electrode is at least partly reflective to visible light.

For improved performance, e.g. in terms of switching time, distribution of particles, durability, etc. it may be preferred to have at least two accumulation electrodes, more preferably at least one located at a side of the pixel.

As mentioned above the present pixel may be relatively small. When switching times and/or optical resolution become more critical smaller pixels are preferred having a length of the pixel smaller than 250 µm, preferably smaller than 150 µm, more preferably smaller than 100 µm, such as smaller than 90 µm. Present designs relate to a length of 150 µm, of 85 µm, of 75 µm, and of 50 µm. A smallest size considered at this point in time is about 25 µm. Also combinations of sizes are envisaged; such could imply a standardized unit length of e.g. 75 µm is used, and multiplicities thereof. From a production point of view somewhat larger pixels are preferred, such as having a length of 300 µm-500 µm. From a control point of view smaller pixels are preferred. Typically a width of the pixel has a similar or the same dimension. The present pixel now provides an optical resolution that is more than sufficient for any application considered at this point in time. In an example maps may be provided on a smartphone, having sufficient optical detail to find ones way. Further a reader can continue reading for a long period of time, without getting tired. It is noted that in this respect LCD-displays provide too much light.

It has been found that a disadvantage of the present pixels, and especially of smaller pixels, is that an electrical breakdown may occur. In order to prevent such a breakdown further measures may be incorporated. In an example the fluid has a reduced permittivity $\varepsilon_r$ of less than 10, preferably of less than 5. However, such change in permittivity typically involves further compounds, such as oils, which are not (fully) compatible with other constituents. Thereto further compounds/components may be added, such as a surfactant, an emulsifier, a polar compound, and a compound capable of forming a hydrogen bond. In view of relatively quick switching times it has been found that the viscosity of the fluid is preferably less than 0.1 Pa*s, such as by using a mixture comprising ethylene glycol.

In an example the present pixel has a rectangular shape, such as a square shape, or a hexagonal shape. In view of switching times these layouts have been found to perform optimally. The hexagonal shape has a further advantage in that each side of the hexagon may be used for accumulating pigment particles. By varying charges or otherwise a first side can be used for red particles, a second side for green particles, and a third side for blue particles, and so further. Such could also be achieved by sub-dividing at least one side of a square pixel.

The present small pixel size makes it possible to make e.g. in a matrix format a red pixel, adjacent to a blue pixel, adjacent to a green pixel, etc. As such a mixture of colours may be provided by activating an intended pixel, in an intended intensity, etc.

In an example the present pixel further comprises a UV-filter. Such is not considered yet, however, inventors have identified that some of the elements inside a pixel and possibly a transparent layer are preferably protected from environ-mental effects, such as UV-light. In an example especially an electrode needs to be protected from UV-light.

In an example of the present pixel the common area is more than 85%, such as 90% transparent, preferably more than 95%; typically transparency is determined at a wavelength of 550 nm. The common area may be made of glass and a suitable polymer, such as poly carbonate (Perspex). The material for the common area, e.g. glass, may have a thickness of 0.1 mm-2 mm, such as 0.2-1 mm. If a flexible pixel and/or display are required it is preferred to use a thin material. If some strength is required, a thicker material is preferred. It has been found that with such transparency energy consumption can even be further reduced. In this respect it is noted that the present pixel uses about 0.1% of prior art pixels, such as LCD-pixels. Such provides huge advantages, e.g. in terms of usage, reduced need for loading devices, smaller charge storing devices, etc. Especially when a power grid is not available such will be appreciated. It is noted that power consumption of e.g. smartphones is significant. Any reduction in power consumption will be beneficial to the earth.

In an example of the present pixel the at least one field electrode is at least partly transparent to visible light, preferably more than 95% transparent. In an example an upper electrode, e.g. in a stack of pixels, is preferably as transparent as possible. In a further example the at least one field electrode is at least partly reflective to visible light, preferably more than 95% reflective, such as when forming a "bottom" electrode, such as in a lowest pixel in a stack. Also combination of the above is envisaged.

In an example the present device comprises a means for processing data, such as a CPU, for making received data visible, for addressing individual pixels, for refreshing a display, etc. The device may further comprise a means for near field communication, such as a receiver and a transmitter. As such a display device may directly be addressed using a suitable signal, the signal providing updated information. Typically such communication also involves handshaking protocols, such as identifying an ID of a device and e.g. a computer or the like providing further information. The present device may in an example comprise a controller, such as a chip, a CPU. The controller, driver, power supply, means for transmitting and receiving may be integrated.

It is noted that by providing (wireless) signals like all display devices may be updated within a small time frame, if required. Such can be repeated e.g. every hour, or every minute, or every second. In fact continuous communication between device and information providing means, such as a computer, may be continuous. As such performance of the present electronic device may be adapted (almost) continuously.

As the present device and in particular an electrophoretic display device consumes a minute amount of energy a small means of providing power, such as a battery, a capacitor, a coil, etc. may be provided. Likewise the present device may be connected to a power grid. It is noted that power consumption of the present device is so low that the display needs to be refreshed at the most only every two hours.

In an example the present electrophoretic display device further comprises a driver circuit for driving the one or more pixels by providing an electro-magnetic field, typically an electrical field. The applied voltage is in an example 15-30 V, preferably being large enough to move particles. Preferably counter ions are present.

In an example of the present device the driver circuit comprises a means for providing a time varying electro-magnetic field between the at least one field electrode and the at least one accumulation electrode, preferably a wave form varying e-m field.

In an example the electrophoretic display device comprises a shared field electrode, i.e. the first electrode. The shared field electrode may be shared by all pixels.

The present driver circuit for use in an electrophoretic display device according to the invention or in a pixel according to the invention, may comprise a means for providing a time varying electro-magnetic field between the at least one field electrode and the at least one accumulation electrode. Therewith movement from charged pigment particles to and from an accumulation electrode and from and to a field electrode is effected. The driver circuit may further provide an electro-magnetic field for clearing pixels (removing charged particles), for driving pixels (introducing charged particles), for resetting pixels (moving charged particles to an initial position). And for applying a static charge, for remaining charged pixels in position occupied at a point in time. Also a field for refreshing may be provided, e.g. for having a similar or same amount of pixels in an earlier position.

In an example the driver circuit comprises a switch for providing a static electro-magnetic field or charge to one or more of the electrodes. In an example only very scarcely a static pulse, or likewise a refresh pulse is provided, such as once every two hours. The pulse may be short and at a low intensity.

In an example the electronic display comprising pixels is provided in a flexible polymer, and the remainder of the display device is provided in glass. The glass may be rigid glass or flexible glass. If required a protection layer is provided. If more than one colour is provided, more than one layer of flexible polymer may be provided. The polymer may be poly ethylene naphthalate (PEN), poly ethylene terephthalate (PET) (optionally having a SiN layer), poly ethylene (PE), etc.

In a further example the electronic display comprising pixels is provided in at least one flexible polymer. As such the display may be attached to any surface, such as by using an adhesive.

In a second aspect the present invention relates to a device comprising the present pixel.

In a third aspect the present invention relates to a use of an electronic device according to the invention, preferably an electrophoretic display device, for one or more of presenting data, projecting data and as a window blind.

The present resolution may be in the order of 300 DPI, or better. A size of a display device may be relatively small such as from 10 cm$^2$ (or smaller), up to relatively large scale, e.g. 2000 cm$^2$.

In a fourth aspect the present invention relates to a product comprising the present electronic device, wherein the product is preferably selected from a window blind, a signage system, e-reader, outdoor display, electronic label, secondary screen, smart glass, colour panel, and a screen.

In a fifth aspect the present invention relates to a method of operating electrophoretic pixel comprising the steps of applying an electrical field, moving nanoparticles from a storage electrode to a field electrode in a vertical direction, spreading out the nanoparticles over the field electrode, and optionally releasing the electrical field, and/or comprising the steps of releasing the electrical field c.q. applying a reverse electrical field, moving nanoparticles spread out over a field electrode towards a storage electrode and collecting said nanoparticles on the storage electrode.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

The invention although described in detailed explanatory context may be best understood in conjunction with the accompanying examples and figures.

SUMMARY OF FIGURES

FIG. 1*a-b* show top views of a layout of an electronic device.

FIG. 2*a,b,c,d* and FIG. 3 show side views of pixels.

DETAILED DESCRIPTION OF FIGURES

Figure 4:
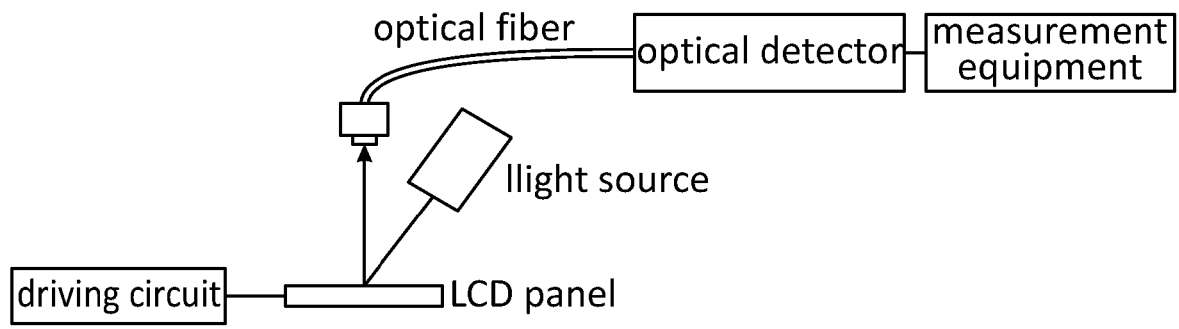
FIGS. 4 and 5*a*-5*b* give a schematic representation of the measurement system for the contrast ratio.

In the figures:
10 pixel
11 fluid
14 first substrate
15 second substrate
16 storage (or accumulation) electrode
17 field electrode
21*a* storage electrode area
21*b* field electrode area
21*c* central area
30 nanoparticle
40 protective layer
50 pixel wall FIG. 1*a* shows a top view of an example of a layout of an electronic device 100. Therein a second substrate is shown, having a storage electrode 16 in a hexagonal pattern.

FIG. 1*b* shows a top view of an example of a layout of an electronic device 100. Therein a second substrate is shown, having a storage electrode 16 in a rectangular pattern.

FIG. 2*a* gives side views of an example of the present pixel 10. Therein a storage electrode area 21*a*, a field or common electrode area 21*b*, and a central area 21*c* are shown. Particles 30 may move from a common area 21*b* towards a storage area 21*a* back and forth, as is indicated by the arrow between FIGS. 2*a* and 2*b*. It is believed that the particles, starting on the storage electrode, move upwards (indicated with arrow 1) when an electrical field is applied, towards the field electrode 21*b*. Than the nanoparticles start to spread out (indicated with arrow 2) over the common electrode area 21*b* in an even distribution (see FIG. 2*c*). In the reverse situation particles start to move towards the storage electrode 16, starting from a position close to the field electrode 21 (indicated with arrow 3), and are directed towards the storage electrode (indicated with arrow 4) and stored there (see FIG. 2*d*). Each pixel comprises at least one storage electrode 16, a field electrode 17, and a protective layer 40. The protective layer 40 and storage electrode 16 are spaced apart over a distance d. The pixels are provided with a first substrate 14 and second substrate 15. When a cross-section of e.g. FIG. 1*a* or 1*b* is taken, the storage electrode may be present at a left and right side of the pixel.

In FIG. 3 it is further shown that storage electrodes of adjacent pixels may be adjacent to one and another and may also be shared, i.e. form one electrode. In addition pixel walls 50 may be present. The pixel is provided with a fluid 11.

Example

A sample 2.0" active matrix TFT, Electronic Paper Display (EPD) panel is produced. The panel has such high resolution (111 dpi) that it is able to easily display fine patterns. Due to its bi-stable nature, the EPD panel requires very little power to update and needs a very low power to maintain an image. The display has the following features:
  a Si TFT active matrix Electronic Paper Display (EPD)
  Resolution of 200×96 pixels
  4 gray scales
  Ultra low power consumption
  Ultra high contrast
  Super Wide Viewing Angle—near 180°
  Extra thin & light
  Single power supply (3.3 V)
  Operating current 2 mA, No waveform transitions, No loading, No RAM Read/Write
  Integrated display controller
  SPI interface
  Outline dimension 57.0(H)×28.8(V)×1.0(T) mm
  Active Area 45.800(H)×21.984(V) mm
  Display Controller UltraChip IC8154C.
  It has the following specifications:

| | |
|---|---|
| Native Reflectance | White 44% |
| | Black 2% |
| Reflective Contrast Ratio | 22:1 |
| Reflector gain | 1.5 |
| Reflectance with gain | White 66% |
| | Black 3% |
| Reflector Cutoff Angle | Gain is 0 45 deg |
| Average Optical Response | 15V pulse 4000 ms |
| Number of Gray Scales | 4 |
| Viewing Angle | CR > 5 70 deg |
| Image Stability | Δ 7L 90 sec |

Figure 5A:
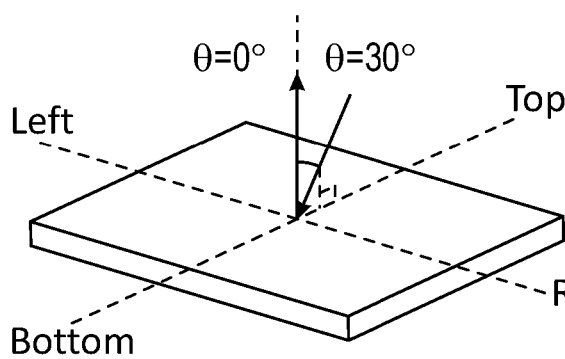
Figure 5B:
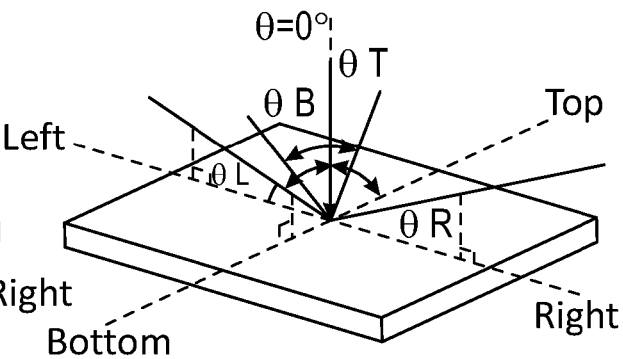

FIGS. 4 and 5*a*-5*b* give a schematic representation of the measurement system for the contrast ratio. Therein the contrast ratio (CR) is the ratio between the reflectance in a full white area (Rl) and the reflectance in a dark area (Rd):CR=Rl/Rd.

The reflectance is expressed as:

$$R = \text{Reflectance white reference} \times (L\text{center}/L\text{white reference})$$

Lcenter is the luminance measured at center in a full white area. Lwhite reference is the luminance of a standard white reference sample as measured in the same equipment and using the same illumination geometry. The viewing angle shall be no more than 2 degrees.

Figure 6:
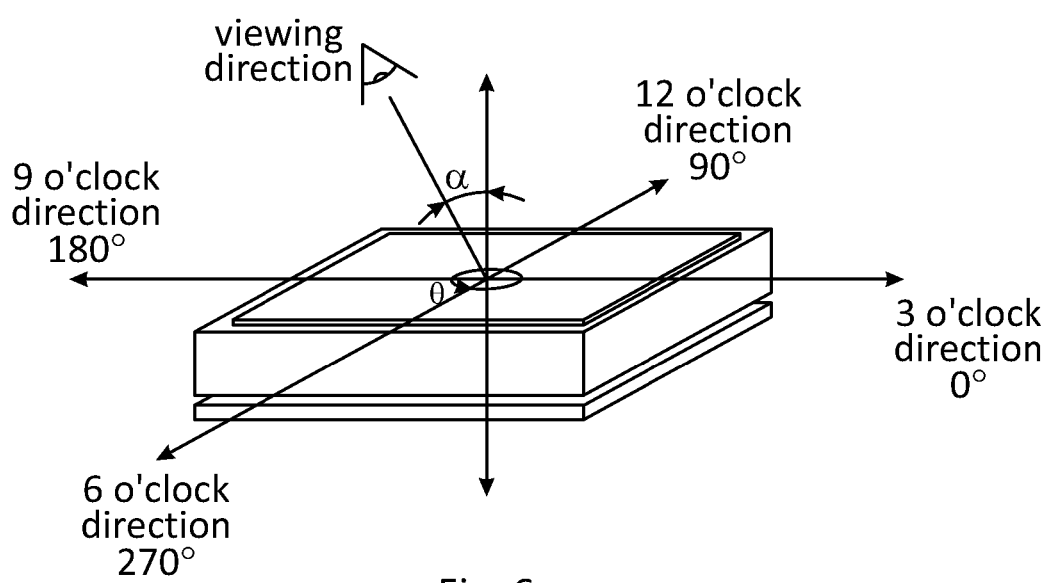
FIG. 6 shows schematics of determining a viewing angle.
Figure 7:
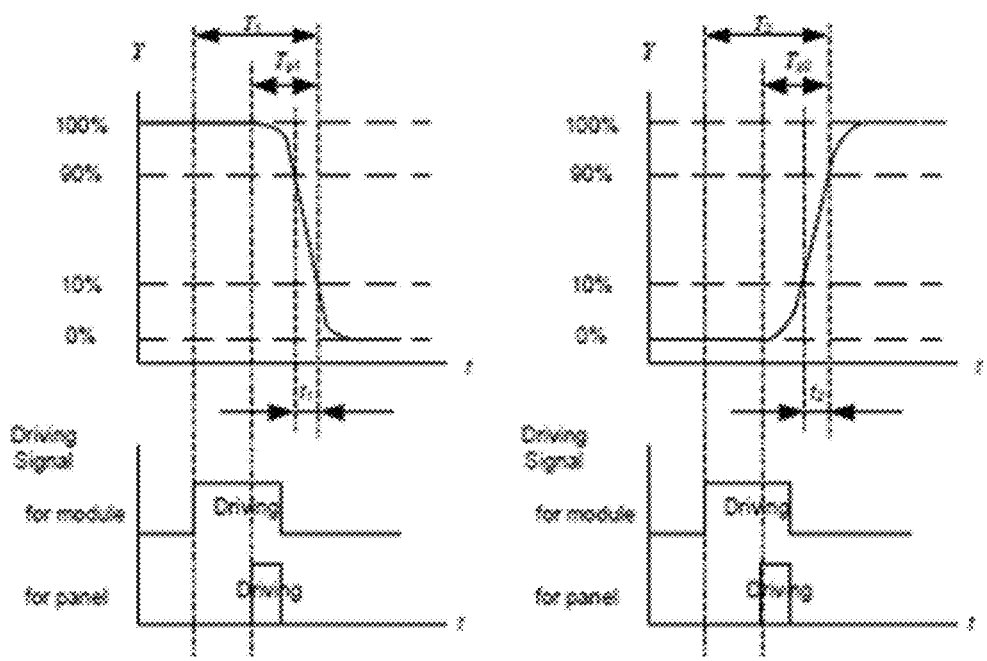
FIG. 7 relates to determination of switching speeds.

The viewing angle (see FIG. 6) is the maximum angle at which a display can be viewed with acceptable visual performance. Below figure shows a scheme of the definition of viewing angle, where α is the declination and θ is the azimuthal rotation. The switching speed (see FIG. 7) is defined as the time it takes to reach 90% of the desired level after a driving signal is applied. Below image explains this in more detail. Therein $T_1$ is the time from start of the module driving signal until a panel reaches 10% of a reflected optical signal; $T_2$ is the time from start of the module driving signal until a panel reaches 90% of a reflected optical signal; $T_{p1}$ is the time from start of the panel driving signal until a panel reaches 10% of a reflected optical signal; $T_{p2}$ is the time from start of the panel driving signal until a panel reaches 90% of a reflected optical signal; $t_1$ is time needed to change the reflected optical signal of the panel from 90% to 10%; and $t_1$ is time needed to change the reflected optical signal of the panel from 10% to 90%.

The switching time from black to white is longer than the time needed for switching from white to black. The specification therefore will state the average switching time as calculated using below formula.

$$T\text{average optical response} = (T1 + T2)/2$$

Reliability testing according to IEC 60 068-2 (-2Bp, -2Ab, 1Ab, 3CA, -14), IEC 62179, and IEC 62180 showed no issues.

It should be appreciated that for commercial application it may be preferable to use one or more variations of the present system, which would similar be to the ones disclosed in the present application and are within the spirit of the invention.

The invention claimed is:

1. An electrophoretic pixel comprising:
   a fluid comprising nanoparticles provided inside of the pixel,
   a first electrode, wherein the first electrode is a field electrode,
   a first transparent substrate, wherein the first electrode is provided on an inner side of the first substrate,
   a protective layer covering the first electrode,
   a second substrate opposite of the first substrate, wherein the first substrate and the second substrate enclose the pixel,
   a second electrode, wherein the second electrode is an accumulation electrode, wherein the second electrode is provided on the second substrate, wherein the second electrode comprises conductive elements covering 2.5-20% of a surface area of the second substrate,
   the nanoparticles comprising a coating a pigment, and further comprising a core,
   wherein the nanoparticles are adapted to be provided with a charge,
   a connection for a driver circuit for applying an electro-magnetic field between the first electrode and the second electrode,
   wherein in use the applied electro-magnetic field between the first electrode and the second electrode by the driver circuit provides movement of the nanoparticles from the first electrode to the second electrode and vice versa,
   wherein the first electrode is not patterned,
   wherein a size of the nanoparticles is from 20-100 nm, and
   wherein a distance between the first and second substrate is smaller than 20 μm,
   wherein a charge on the nanoparticles is 0.1e to 10e per particle ($5 \times 10^{-7}$-0.1 C/m$^2$), and
   wherein the coating of the nanoparticles is made from a material selected from conducting and semi-conducting materials, and
   wherein the dynamic viscosity of the fluid is 0.1 Pa*s or less, and
   wherein a distance (d) between the protective layer and second electrode is from 2-10 μm,
   wherein the fluid is present in an amount of 1-100 gr/m$^2$, and
   wherein the pigments are present in an amount of 0.02-30 gr/m$^2$.

2. The pixel according to claim 1, wherein the conductive elements are for storing the nanoparticles.

3. The pixel according to claim 1, comprising a hexagonal shape, wherein the second electrode comprises two or more electrical connection junctions configured for arranging the pixel in a honeycomb structure.

4. The pixel according to claim 1, wherein the first and/or second electrode is/are a spray-coated electrode.

5. The pixel according to claim 1, wherein the nanoparticles have a colour selected from the group consisting of cyan, magenta, yellow, black and white.

6. The pixel according to claim 1, further comprising a reflector for reflecting light that has passed through at least the first transparent substrate and the liquid, wherein the reflector is formed by at least one metal layer.

7. The pixel according to claim 1, further comprising an active matrix arranged on the second substrate on a side facing the liquid, wherein the active matrix comprises for each pixel,
   at least two metal layers; and
   a dielectric layer.

8. The pixel according to claim 7, further comprising a storage capacitor formed using the at least two metal layers and the dielectric layer.

9. The pixel according to claim 1, wherein the pixel further comprises a scattering element configured to diffusively scatter light reflected by the reflector.

10. The pixel according to claim 1, wherein one or more of:
    the fluid comprises one or more of a surfactant, an emulsifier, a polar compound, and a compound capable of forming a hydrogen bond,
    the fluid has a relative permittivity $\varepsilon_r$ of less than 10, and a viscosity of less than 0.1 Pa*s, the fluid is present in an amount of 1-10 gr/m$^2$,
    the coloured particles are present in an amount of 0.02-3 gr/m$^2$, and
    the coloured particles are smaller than 300 nm, preferably smaller than 200 nm.

11. The pixel according to claim 1, wherein the pixel comprises pixel walls.

12. A device comprising one or more pixels according to claim 1, comprising:

a driver circuit, wherein the driver circuit comprises a means for providing a time varying electro-magnetic field between at least one field electrode and at least one storage electrode, such as a wave form varying electro-magnetic field, wherein the driver circuit comprises a switch for providing a static electro-magnetic field or charge to one or more of the electrodes.

13. A product comprising an electronic device according to claim 12, wherein the product is selected from the group consisting of a window blind, a signage system, an e-reader, an outdoor display, an electronic label, a secondary screen, a smart glass, a colour panel, a screen.

14. A method of operating an electrophoretic pixel, the method comprising at least one of:

providing an electrophoretic pixel comprising:
- a fluid comprising nanoparticles provided inside of the pixel,
- a first electrode, wherein the first electrode is a field electrode,
- a first transparent substrate, wherein the first electrode is provided on an inner side of the first substrate,
- a protective layer covering the first electrode,
- a second substrate opposite of the first substrate, wherein the first substrate and the second substrate enclose the pixel,
- a second electrode, wherein the second electrode is an accumulation electrode, wherein the second electrode is provided on the second substrate, wherein the second electrode comprises conductive elements covering 2.5-20% of a surface area of the second substrate, the nanoparticles comprising a coating a pigment, and further comprising a core, wherein the nanoparticles are adapted to be provided with a charge, a connection for a driver circuit for applying an electromagnetic field between the first electrode and the second electrode, wherein in use the applied electro-magnetic field between the first electrode and the second electrode by the driver circuit provides movement of the nanoparticles from the first electrode to the second electrode and vice versa, wherein the first electrode is not patterned, wherein a size of the nanoparticles is from 20-100 nm, and wherein a distance between the first and second substrate is smaller than 20 μm, wherein a charge on the nanoparticles is 0.1e to 10e per particle ($5*10^{-7}$-0.1 $C/m^2$), and wherein the coating of the nanoparticles is made from a material selected from conducting and semi-conducting materials, and wherein the dynamic viscosity of the fluid is 0.1 Pa*s or less, and wherein a distance (d) between the protective layer and second electrode is from 2-10 μm, wherein the fluid is present in an amount of 1-100 $gr/m^2$, and wherein the pigments are present in an amount of 0.02-30 $gr/m^2$, applying an electrical field, moving nanoparticles from a storage electrode to a field electrode in a vertical direction, spreading out the nanoparticles over the field electrode, releasing the electrical field, applying a reverse electrical field, moving nanoparticles spread out over the field electrode towards the storage electrode, and collecting said nanoparticles on the storage electrode.

* * * * *